US011475289B2

(12) United States Patent
Okanohara et al.

(10) Patent No.: US 11,475,289 B2
(45) Date of Patent: Oct. 18, 2022

(54) LEARNING DEVICE UNIT

(71) Applicant: Preferred Networks, Inc., Tokyo (JP)

(72) Inventors: Daisuke Okanohara, Tokyo (JP); Ryosuke Okuta, Tokyo (JP); Eiichi Matsumoto, Tokyo (JP); Keigo Kawaai, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 552 days.

(21) Appl. No.: 14/907,503

(22) PCT Filed: Jun. 26, 2015

(86) PCT No.: PCT/JP2015/068459
§ 371 (c)(1),
(2) Date: Jan. 25, 2016

(87) PCT Pub. No.: WO2016/199313
PCT Pub. Date: Dec. 15, 2016

(65) Prior Publication Data
US 2017/0161603 A1 Jun. 8, 2017

(30) Foreign Application Priority Data

Jun. 8, 2015 (JP) .............................. JP2015-115532

(51) Int. Cl.
*G06N 3/06* (2006.01)
*G06N 3/04* (2006.01)
*G06N 3/08* (2006.01)

(52) U.S. Cl.
CPC ................. *G06N 3/08* (2013.01); *G06N 3/04* (2013.01); *G06N 3/0454* (2013.01)

(58) Field of Classification Search
CPC ........... G06N 3/0454; G06N 3/08; G06N 3/04
See application file for complete search history.

(56) References Cited

U.S. PATENT DOCUMENTS

| 6,108,616 A | 8/2000 | Borchers et al. |
| 6,487,534 B1 | 11/2002 | Thelen et al. |
| 6,782,375 B2 * | 8/2004 | Abdel-Moneim ....... G06N 3/02 706/46 |

(Continued)

FOREIGN PATENT DOCUMENTS

| JP | 2013-106202 | 5/2013 |
| JP | 2014-228972 | 12/2014 |
| WO | WO2013-181637 A2 | 12/2013 |

OTHER PUBLICATIONS

Turnbull, L., & Samanta, B. (Apr. 2013). Cloud robotics: Formation control of a multi robot system utilizing cloud infrastructure. In 2013 Proceedings of IEEE Southeastcon (pp. 1-4). IEEE. (Year: 2013).*

(Continued)

*Primary Examiner* — Michael J Huntley
*Assistant Examiner* — Oluwatosin O Alabi
(74) *Attorney, Agent, or Firm* — Klarquist Sparkman, LLP

(57) ABSTRACT

[Problem] To provide a learning device for performing more efficient machine learning.
[Solution] A learning device unit according to one embodiment comprises at least one learning device and a connection device for connecting an intermediate learning device having an internal state shared by another learning device unit to the at least one learning device.

29 Claims, 11 Drawing Sheets

(56) References Cited

U.S. PATENT DOCUMENTS

| | | | |
|---|---|---|---|
| 7,849,032 B1* | 12/2010 | Campos | G06N 3/08 706/25 |
| 8,897,767 B2 | 11/2014 | Kojima | |
| 9,293,137 B2 | 3/2016 | Kawamura et al. | |
| 9,443,192 B1* | 9/2016 | Cosic | G06N 5/048 |
| 9,990,587 B2 | 6/2018 | Okanohara et al. | |
| 10,387,794 B2 | 8/2019 | Okanohara et al. | |
| 2005/0108022 A1* | 5/2005 | Bhattacharya | G06Q 10/06 705/7.37 |
| 2005/0119791 A1* | 6/2005 | Nagashima | G06N 3/008 700/253 |
| 2007/0299947 A1* | 12/2007 | El-Damhougy | H04B 7/2606 709/223 |
| 2008/0208372 A1* | 8/2008 | Pannese | G05B 13/027 700/48 |
| 2010/0010949 A1* | 1/2010 | Ito | G06N 3/0454 706/20 |
| 2014/0257805 A1 | 9/2014 | Huang et al. | |
| 2014/0278951 A1* | 9/2014 | O'Connor | G06Q 30/0251 705/14.49 |
| 2015/0019214 A1 | 1/2015 | Wang et al. | |
| 2016/0140408 A1* | 5/2016 | Shen | G06K 9/4676 382/157 |
| 2016/0306725 A1* | 10/2016 | Hare | G06F 11/2263 |

OTHER PUBLICATIONS

Petrovic, M., Miljkovic, Z., & Babic, B. (2013). Integration of process planning, scheduling, and mobile robot navigation based on TRIZ and multi-agent methodology. FME Transactions, 41(2), 120-129. (Year: 2013).*

Rojas, R. (1996). The backpropagation algorithm. In Neural networks (pp. 149-182). Springer, Berlin, Heidelberg. (Year: 1996).*

Cho H, Wysk Ra. A robust adaptive scheduler for an intelligent workstation controller. The International Journal of Production Research. Apr. 1, 1993;31(4):771-89. (Year: 1993).*

Joo J, Park S, Cho H. Adaptive and dynamic process planning using neural networks. International Journal of Production Research. Jan. 1, 2001;39(13):2923-46. (Year: 2001).*

Kashiwagi et al., "Speaker adaptation using speaker-normalized DNN based on speaker codes," IEICE Technical Report SP2014-118, pp. 105-110 (Dec. 2014).

Kono et al., "Transfer Learning Method Using Ontology for Heterogeneous Multiagent Reinforcement Learning," *Int'l Journal of Advanced Computer Science and Applications*, vol. 5, No. 10, pp. 156-164 (2014).

International Search Report dated Aug. 4, 2015, from International Patent Application No. PCT/JP2015/068459, 2 pp. (English translation).

Iwaki et al., "Optimally Generalizing Neural Networks with Ability to Recover from Single Stuck-at r Faults," *IEICE Trans.*, pp. 805-813 (Feb. 2000) (with partial English translation).

Kamishima, "Transfer Learning," *The Japanese Society for Artificial Intelligence*, pp. 572-580 (Jul. 2010) (with partial English translation).

Kashiwagi et al., "Speaker adaptation using speaker-normalized DNN based on speaker codes," IEICE Technical Report SP2014-118, pp. 105-110 (Dec. 2014) (with partial English translation).

Okanohara, "Practical Techniques for Large-scale Deep Learning," *The Japanese Society for Artificial Intelligence*, pp. 785-792 (Sep. 2013) (with partial English translation).

Rumelhart et al., "Learning representations by back-propagating errors", *Nature*, vol. 323, pp. 533-536 (Oct. 1986).

Hido et al., "Jubatus: An Open Source Platform for Distributed Online Machine Learning," pp. 1-6 (2013).

"Jubatus," Preferred Networks, Inc. and Nippon Telegraph and Telephone Corporation, http://jubat.us/ja/overview/mix.html, archived copy dated Jan. 15, 2015 downloaded from https://web.archive.org/web/20150115233539/http://jubat.us/ja/overview/mix.html, 3 pages.

Huang et al., "Cross-Language Knowledge Transfer Using Multilingual Deep Neural Network with Shared Hidden Layers", IEEE International Conference on Acoustics, Speech and Signal Processing, pp. 7304-7308 (May 2013).

* cited by examiner

LEARNING DEVICE UNIT

CROSS REFERENCE TO RELATED APPLICATIONS

This application is the U.S. National Stage of International Application No. PCT/JP2015/068459, filed Jun. 26, 2015, which in turn claims priority to and the benefit of Japanese Application No. 2015-115532, filed Jun. 8, 2015, the entire contents of which are hereby incorporated herein by reference.

FIELD

The disclosed technology relates to a learning device that uses machine learning.

BACKGROUND

Japanese patent application laid-open publication No. 2013-106202 (hereinafter "Patent Document 1") discloses a technology pertinent to a learning device that uses machine learning. Patent Document 1 discloses a technology that if there is similarity between the model each agent for performing machine learning includes and the model another agent for performing machine learning includes, then these models in total are synthesized to improve learning efficiency. Patent Document 1 is hereby incorporated herein by reference in its entirety.

Patent Document 1: Japanese patent application laid-open publication No. 2013-106202

SUMMARY

Recently there has been a need for a learning device which performs more efficient machine learning.

A learning device unit according to one aspect comprises at least one learning device and a connection device for connecting an intermediate learning device having an internal state shared by another learning device unit to the at least one learning device.

A computer program according to one aspect is configured to cause a computer to function as at least one learning device and a connection device for connecting an intermediate learning device having an internal state shared by another learning device unit to the at least one learning device.

DETAILED DESCRIPTION

Figure 1:
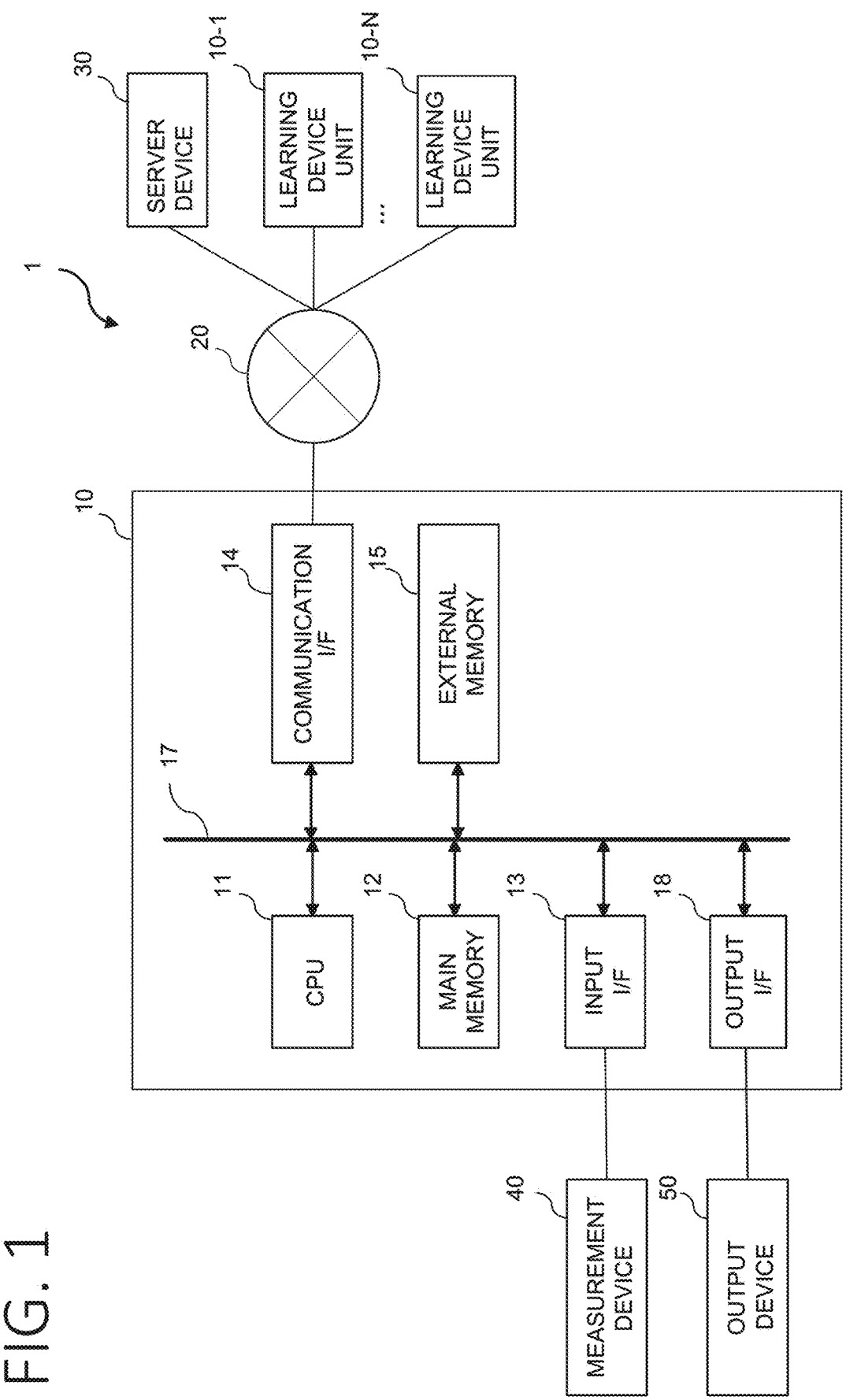
FIG. 1 is a schematic diagram showing a configuration example of a system using a learning device unit according to various embodiments of the present invention.

Various embodiments of the present invention are described below with reference to the appropriate drawings. The same reference number is used for the same elements in the drawings.

1. System Configuration

FIG. 1 is a schematic diagram showing a configuration example of a system using a learning device unit according to various embodiments of the present invention. This system 1 includes learning device units 10-1 to 10-N, a server device 30 connected to a communication circuit 20, a measurement device 40, and an output device 50, as shown in FIG. 1. Each of the learning device units 10-1 to 10-N (sometimes referred to below collectively as "the learning device unit 10") is capable of communicating information with another learning device unit of the learning device units 10-1 to 10-N and with the server device 30 via the communication circuit 20.

2. Hardware Configuration of Learning Device Unit 10

Each of the learning device units 10-1 to 10-N is installed in a corresponding individual apparatus (device). Respective measurement devices 40-1 to 40-N and output devices 50-1 to 50-N (not shown) are connected to the learning device units 10-1 to 10-N. These measurement devices 40-1 to 40-N and output devices 50-1 to 50-N are sometimes each installed in a corresponding individual apparatus (device), and are sometimes connected as a separate apparatus using communication means as a separate device. In one embodiment, the learning device unit 10 is any information processing device capable of executing machine learning, possible examples of which include an automobile, an airplane, a robot, or another industrial machine; an environment control terminal of a chemical plant, facility horticulture, or the like; an information processing server; a personal computer; a tablet; a portable phone; a smartphone; a portable information terminal; a touch pad; and the like, but the learning device unit is not limited to these examples.

A hardware configuration example of the learning device unit 10 is shown in the block denoted by the reference number "10" in FIG. 1. As shown in the drawing, the learning device unit 10 includes a CPU 11, a main memory 12, an input I/F 13, a communication I/F 14, an external memory 15, and an output I/F 18, these constituent elements being electrically connected to each other via an internal bus 17.

The CPU 11 loads an operating system and other various programs from the external memory 15 in the main memory 12, and executes commands included in the loaded programs. The main memory 12 is used in order to store the programs executed by the CPU 11, and is configured from DRAM, for example.

The input I/F 13, which has the function of receiving output data of the measurement device 40, is connected with the constituent elements by the internal bus 17. Various measurement data, which is the output of the measurement device 40, includes information acquired by sensors and the like, e.g., temperature, humidity, position information, image data, etc. The data may be video data, a temperature data string acquired at constant intervals, or another type of time-series data. The output I/F 18 receives data from the constituent elements through the internal bus 17, and outputs the data to the output device 50 which is outside of the learning device unit. The data outputted to the output device 50 is assumed to be, e.g., control information on a motor being driven, information on components such as a buzzer, control switch, accelerator or brake of an automobile, or a liquid crystal display, or other control information relevant to the output device.

The communication I/F 14 is embodied as hardware, firmware, communication software such as a TCP/IP driver or a PPP driver, or a combination thereof, and is configured so as to be capable of communicating various information with the other learning device unit 10 and the server device 30 via the communication network 20.

The external memory 15 is configured from, e.g., a magnetic disc drive, flash memory, or the like, and the external memory stores the operating system and other various programs.

The learning device unit 10 according to one embodiment having the configuration described above can be made to function as a learning device unit for performing machine learning, by having the CPU 11 execute predetermined programs loaded in the main memory 12 from the external memory 15. For example, this learning device unit for performing machine learning is actualized as a unit including a plurality of learning devices or the like modeled by a neural network, by having the CPU 11 execute various programs.

3. Summary of Learning Device Modeled by Neural Network

Figure 2:
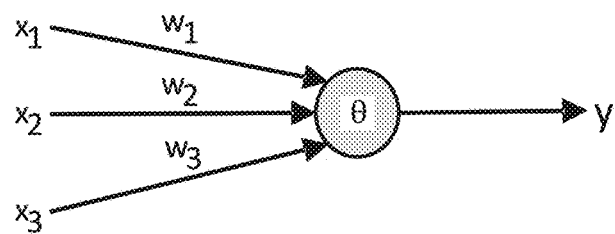
FIG. 2 is a schematic drawing showing a model of a neuron.

First, a model of a neuron used in a modeled learning device is described with reference to FIG. 2. FIG. 2 is a schematic drawing showing a model of a neuron.

The neuron outputs an output y for a plurality of inputs x (the inputs $x_1$ to $x_3$ are an example here), as shown in FIG. 2 Each input x is given a weighting w corresponding to the input x. The neuron thereby outputs an output y expressed by the following formula. The input x, output y, and weighting w are all vectors.

$$y = f_k(\Sigma_{i=1}^n x_i w_i - \theta) \qquad [\text{Eq. 1}]$$

The symbol θ here represents bias, and $f_k$ is an activation function.

Figure 3:
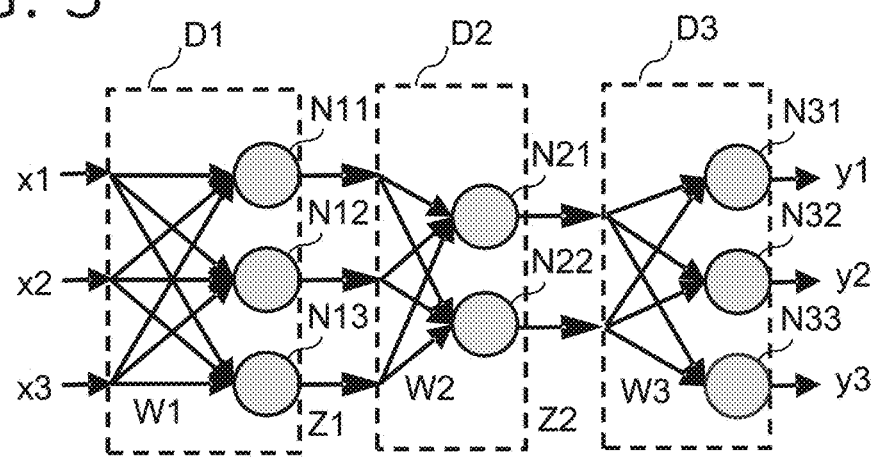
FIG. 3 is a schematic drawing showing a neural network having three layers of weighting.

Next, a neural network combining the neurons described above and having three layers of weighting is described with reference to FIG. 3. FIG. 3 is a schematic drawing showing a neural network having three layers of weighting.

Multiple inputs x (the inputs x1 to x3 are an example here) are inputted from the left side of the neural network, and the results y (the results y1 to y3 are an example here) are outputted from the right side, as shown in FIG. 3.

Specifically, the inputs x1 to x3 are inputted after having been given weightings corresponding to each of the three neurons N11 to N13. The weightings given to these inputs are collectively marked as w1.

The neurons N11 to N13 output respective characteristic vectors z11 to z13. These characteristic vectors z11 to z13 are collectively marked as z1. The characteristic vector z1 is a characteristic vector between the weighting w1 and the weighting w2.

The characteristic vectors z11 to z13 are inputted after having been given weightings corresponding to the respective two neurons N21, N22. The weightings given to these characteristic vectors are collectively marked as w2.

The neurons N21, N22 output the characteristic vectors z21, z22 respectively. These characteristic vectors z21, z22 are collectively marked as z2. This characteristic vector $z_2$ is a characteristic vector between the weighting $w_2$ and the weighting $w_3$.

The characteristic vectors z21, z22 are inputted after having been given weightings corresponding to each of the three neurons N31 to N33. The weightings given to these characteristic vectors are collectively marked as w3.

Lastly, the neurons N31 to N33 output the results y1 to y3, respectively.

The weightings w1 to w3 can be learned by the error back propagation method (back propagation). Information on errors enters from the right side and flows to the left side. The error back propagation method is a method of adjusting (learning) the respective weightings in each neuron so as to reduce the difference between an output y when an input x is inputted and the true output y (the label).

It is conceivable that a neural network having these three weightings could include three sequentially connected learning devices, i.e., the learning devices D1 to D3. The variables (the characteristic vectors z1, z2) joining the learning devices automatically attain their optimal expression as the learning of the learning devices progresses. There is no need for a person to give an explicit expression of these characteristic vectors. Because these characteristic vectors are automatically decided by learning, in many cases it is difficult to know specifically what is being expressed.

4. Basic Configuration of Learning Device Unit 10 According to First Embodiment Next, based on the summary described in "3" above, a basic configuration example of the learning device unit 10 according to the first embodiment will be described with reference to FIG. 4.

Figure 4:
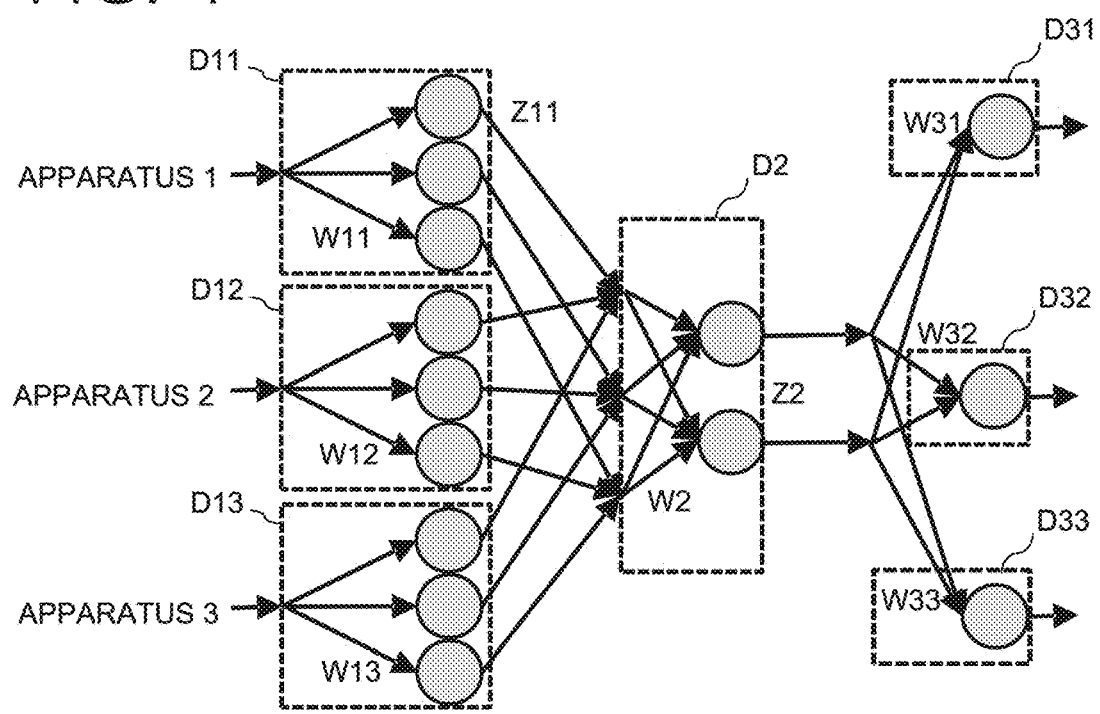
FIG. 4 is a schematic drawing showing a conceptual configuration example of the learning device unit 10 according to the first embodiment of the present invention, the learning device unit 10 having been modeled using a neural network.

FIG. 4 is a schematic drawing showing a conceptual configuration example of the learning device unit 10 according to the first embodiment of the present invention, the learning device unit 10 having been modeled using a neural network.

A learning device unit (referred to as "learning device unit 10-1" for convenience) installed in apparatus 1 includes, as one example, an input-side learning device D11 disposed on the input side and an output-side learning device D31 disposed on the output side. The learning device unit 10-1 may instead include either the input-side learning device D11 alone or the output-side learning device D31 alone. Furthermore, the learning device unit 10-1 installed in the apparatus 1 includes a connecting function (not shown) for connecting, e.g., an intermediate learning device D2 disposed in the server device 30 (see FIG. 1) to a location between the input-side learning device D11 and the output-side learning device D31. When the learning device unit 10-1 includes either the input-side learning device D11 alone or the output-side learning device D31 alone, the connecting function connects the intermediate learning device D2 to the included learning device.

Similarly, the learning device unit installed in an apparatus 2 (apparatus 3) (referred to as the "learning device unit 10-2" ("learning device unit 10-3") for convenience) includes an input-side learning device D12 (D13) disposed on the input side and an output-side learning device D32 (D33) disposed on the output side. The learning device unit 10-2 (10-3) may instead include either the input-side learning device D12 (D13) alone or the output-side learning device D32 (D33) alone. Furthermore, the learning device unit 10-2 (10-3) installed in the apparatus 2 (apparatus 3) includes a connecting function (not shown) for connecting, e.g., an intermediate learning device D2 disposed in the server device 30 to a location between the input-side learning device D12 (D13) and the output-side learning device D32 (D33). When the learning device unit 10-2 (10-3) includes either the input-side learning device D12 (D13) alone or the output-side learning device D32 (D33) alone, the connecting function connects the intermediate learning device D2 to the included learning device.

Focusing on the learning device unit 10-1 installed in the apparatus 1, the input-side learning device D11 gives the corresponding weightings W11 to one input and delivers the input to the corresponding neurons. The characteristic vectors (the collection thereof) outputted by these neurons are outputted as characteristic vectors Z11.

The connecting function (not shown) thereafter "connects" the intermediate learning device D2 to a location between the input-side learning device D11 and the output-side learning device D31 (when there is only the input-side learning device D11 or only the output-side learning device D31, the intermediate learning device D2 is connected to that learning device). Specifically, the connecting function transmits the characteristic vectors Z11 outputted by the input-side learning device D11 to the server device 30 (FIG. 1) via the communication circuit. Having received the characteristic vectors Z11, the server device 30 outputs the vectors to the intermediate learning device D2 modeled by the server device 30 through the neural network. The characteristic vectors Z11 are given weightings W2 corresponding to each vector, and the intermediate learning device D2 inputs the weighted vectors and acquires characteristic vectors Z2 as output. Furthermore, the server device 30 transmits the characteristic vectors Z2 thus obtained to the learning device unit 10-1 via the communication circuit. Having received the characteristic vectors Z2, the learning device unit 10-1 outputs the characteristic vectors Z2 to the output-side learning device D31. Thus, the characteristic vectors Z11 are transmitted to the intermediate learning device D2 of the server device 30, the characteristic vectors Z2 are received from the intermediate learning device D2, and the received characteristic vectors Z2 are outputted to the output-side learning device D31. This series of actions is equivalent to the "connecting" performed by the "connecting function." This connecting function is a function actualized by a predetermined program executed by the CPU 11 installed in the learning device unit 10-1.

When the connecting function communicates information (the characteristic vectors Z11, Z2) with the server device 30, the communication I/F 14 (see FIG. 1) is used.

The received characteristic vectors Z2 are given corresponding weightings W31, and the output-side learning device D31 inputs these weighted vectors and acquires output.

The learning device unit 10-2 (10-3) installed in the apparatus 2 (apparatus 3) has the same configuration as that described above.

The learning device units are each connected with a unique measurement device and output device. For example, the learning device unit 10-1 is connected with a unique respective measurement device 40-1 and output device 50-1. The weighting used in the input-side learning device and the weighting used by the output-side learning device are unique to the learning device unit. Specifically, the input-side learning devices D11 to D13 use respective unique weightings W11 to W13, and the output-side learning devices D31 to D33 use respective unique weightings W31 to W33. The weighting W2 (information constituting the internal state) used by the intermediate learning device D2 is shared by all the learning device units.

The modeled network shown in FIG. 4 could conceivably have the same configuration as the modeled network shown in FIG. 3, and learning using a normal error back propagation method is therefore also possible in the network shown in FIG. 4. Specifically, errors propagate in the opposite direction of the arrows shown in FIG. 4 (i.e., from the right side of the image toward the left side), and the neurons (or the weightings given to them) included in the learning devices are learned.

In the present embodiment, a configuration was described in which the learning device units share an intermediate learning device D2 (more specifically, the internal state of the intermediate learning device) actualized by the server device 30, but other embodiments can employ a configuration in which the learning device units each have a unique intermediate learning device. In this case, the learning device units may communicate information (weightings) constituting internal states amongst each other at a constant frequency, so that the intermediate learning devices of the learning device units have the same internal state among all of the learning device units (i.e., so that the internal state of all the intermediate learning devices is the same). To ensure that all of the intermediate learning devices have the same internal state, a certain specific learning device unit (e.g., the learning device unit having the newest internal state) may transmit information (weighting) constituting the internal state to all of the other learning device units without making any changes, or a certain specific learning device unit (e.g., the learning device unit having the newest internal state) may transmit only the difference between its own internal state and the internal states of the other learning device units to those other learning device units. Furthermore, the intermediate learning devices may use information (weighting) obtained by mixing (in a calculation process which could be but is not limited to linear summation, for example) the information (weighting) constituting their internal states.

5. Basic Configuration of Learning Device Unit 10 According to Second Embodiment Next, an example of the basic configuration of a learning device unit 10 according to a second embodiment will be described using FIG. 5.

Figure 5:
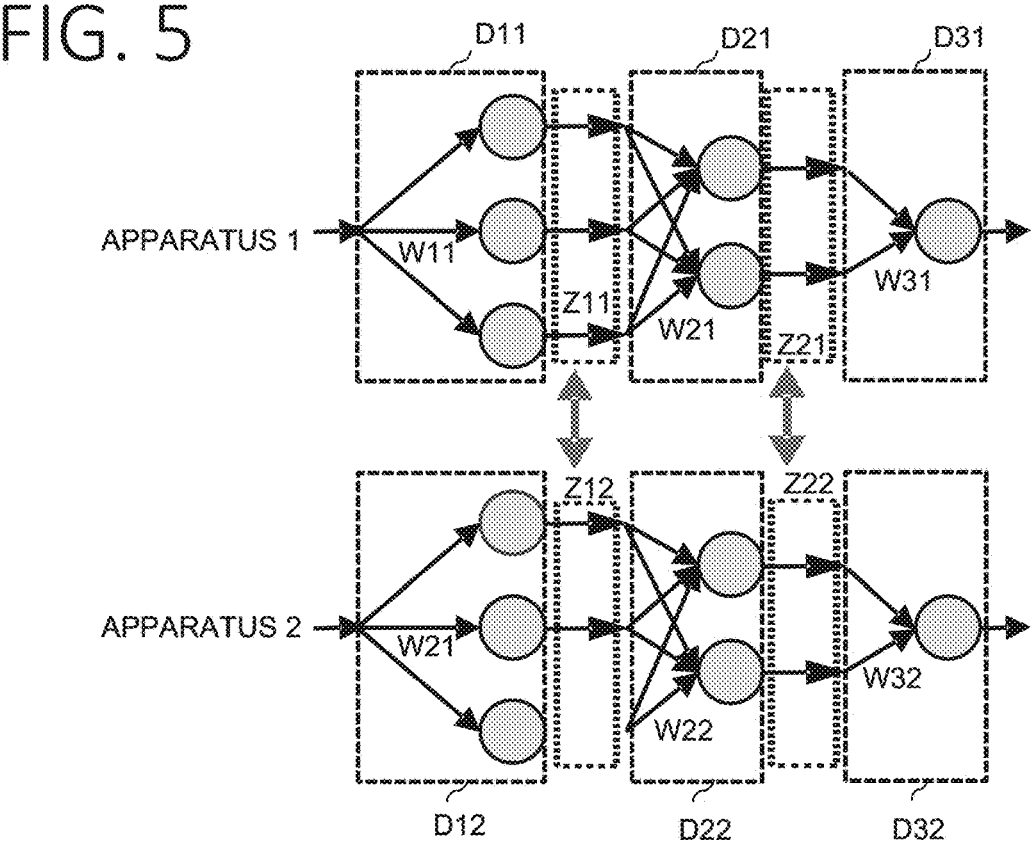
FIG. 5 is a schematic drawing showing a conceptual configuration example of the learning device unit 10 according to the second embodiment of the present invention, the learning device unit 10 having been modeled using a neural network.

FIG. 5 is a schematic drawing showing a conceptual configuration example of the learning device unit 10 according to the second embodiment of the present invention, the learning device unit 10 having been modeled using a neural network. The following description focuses only on points that are different from the first embodiment described above.

The learning device unit installed in each apparatus, or the learning device unit 10-1 installed in the apparatus 1 here, for example, includes an input-side learning device D11 disposed on the input side, an output-side learning device D31 disposed on the output side, and an intermediate learning device D21 connected between the input-side learning device D11 and the output-side learning device D31. The learning device unit 10-1 may instead include either the input-side learning device D11 alone or the output-side learning device D31 alone. The intermediate learning device D21 is also connected between the input-side learning device D11 and the output-side learning device D31 (or to the learning device present when there is only the input-side learning device D11 or only the output-side learning device D31) by the "connecting function" actualized by a predetermined program executed by the CPU 11 installed in the learning device unit 10-1.

The present embodiment deals with a case in which the intermediate learning devices of the learning device units do not have the same internal state (weighting).

Referring to FIG. 5, the intermediate learning device D21 of the learning device unit 10-1 and the intermediate learning device D22 of the learning device unit 10-2 do not directly share a weighting. Instead, one learning device unit (e.g., the learning device unit 10-1) transmits a set of the information (the characteristic vectors Z11) inputted to the intermediate learning device D21 and the corresponding information (the characteristic vectors Z21) outputted from the intermediate learning device D21 to another learning device unit (e.g., the learning device unit 10-2) via the communication circuit. This set, is equivalent to information that results in the intermediate learning device D21 of the learning device unit 10-1 having a weighting W21 as an internal state (this information is also equivalent to the "information constituting the internal state" set forth in the patent claims).

Having received this set, the learning device unit 10-2 replaces the characteristic vectors Z11 in the set with the characteristic vectors Z12, replaces the characteristic vectors Z21 in the set with the characteristic vectors Z22, and learns the weighting W22 of the intermediate learning device D22. This learning can be executed using a normal error back propagation method.

Thus, the learning device unit 10-1 and the learning device unit 10-2 do not directly share the weighting of an intermediate learning device, but do indirectly and substantially share the weighting of an intermediate learning device.

6. Basic Configuration of Learning Device Unit 10 According to Third Embodiment

Next, an example of the basic configuration of a learning device unit 10 according to a third embodiment will be described using FIG. 6.

Figure 6:
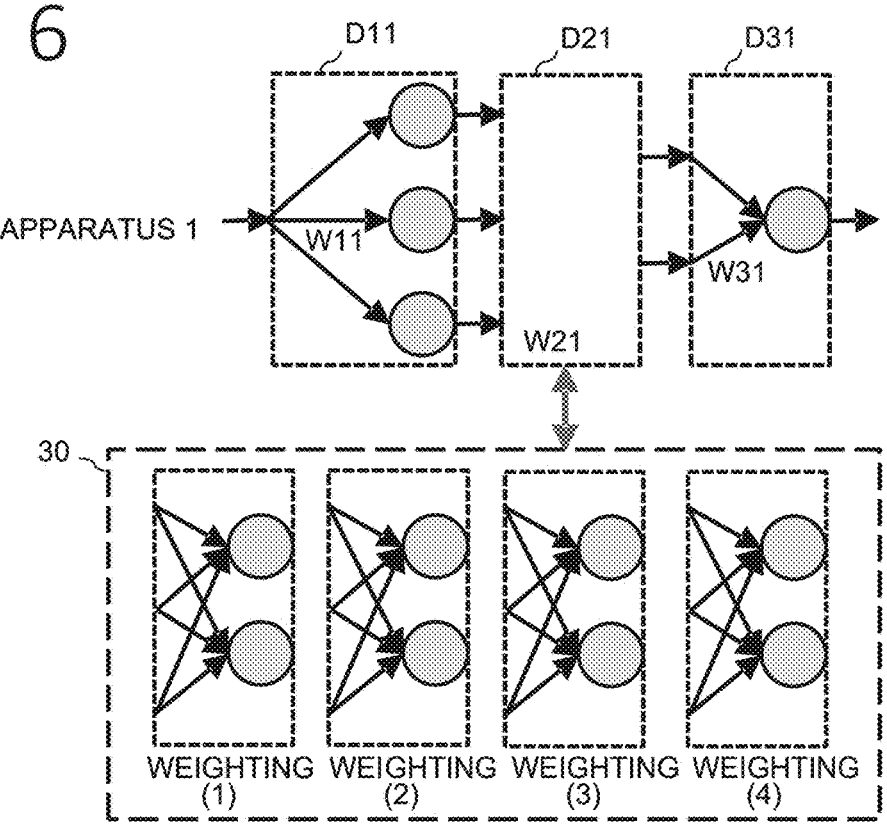
FIG. 6 is a schematic drawing showing a conceptual configuration example of the learning device unit 10 according to the third embodiment of the present invention, the learning device unit 10 having been modeled using a neural network.

FIG. 6 is a schematic drawing showing a conceptual configuration example of the learning device unit 10 according to the third embodiment of the present invention, the learning device unit 10 having been modeled using a neural network. The following description focuses only on points that are different from the first and second embodiments described above.

The database provided to the server device 30 (or at least one certain specific learning device unit) stores multiple weightings (FIG. 6 shows weightings (1) through (4) as an example) as the weighting used in the intermediate learning device. These weightings may be a reproduction of weightings used in the intermediate learning device of a specific learning device unit (e.g., the learning device unit thought to have executed the most effective or most reliable learning).

The learning device unit of a certain apparatus (the learning device unit 10-1 installed in the apparatus 1 as an example here) receives, via the communication circuit, information pertaining to any of the weightings (1) through (4) from the server device 30, depending on the input or internal state of the input-side learning device D11.

This entire learning device unit performs learning according to a normal error back propagation method using the weighting received by the intermediate learning device disposed in the learning device unit, whereby each of the weightings (W11, W21, W31) included in the input-side learning device D11, the intermediate learning device D21, and the output-side learning device D31 are updated.

7. Specific Application Example Utilizing Learning Device Unit 10 According to Above Embodiments Next, a specific application example is described, in which the learning device unit 10 according to the first through third embodiments is applied.

Figure 7:
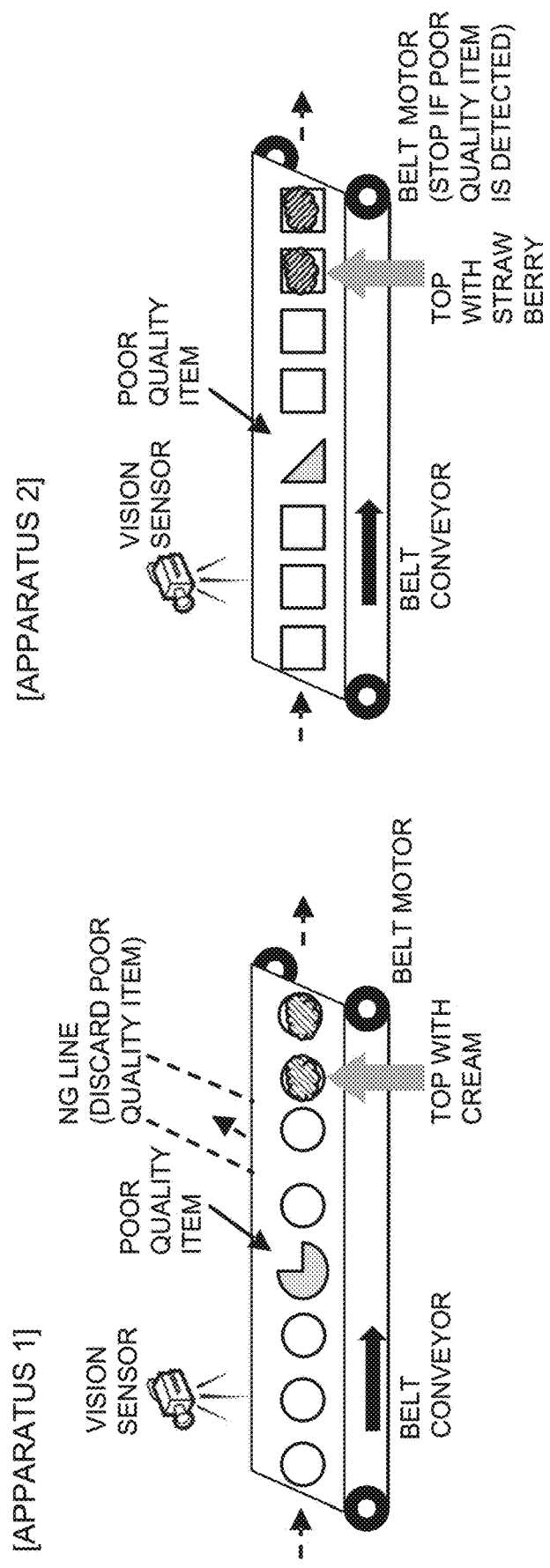
FIG. 7 is a schematic drawing showing an outline of a specific application of the learning device unit according to the various embodiments of the present invention.

To make the description easier to understand, a specific description is given of a case in which a learning device unit according to the embodiments is used in a manufacturing process used in a food plant or the like. Specifically, FIG. 7 is referenced to describe the operation of topping round cakes and square cakes carried on a belt conveyor with cream and strawberries, respectively. FIG. 7 is a schematic drawing showing an outline of a specific application of the learning device unit according to the various embodiments of the present invention.

The learning device unit installed in the apparatus 1 handles the operation of topping round cakes with cream, as shown in FIG. 7(a). The learning device unit installed in the apparatus 2 handles the operation of topping square cakes with strawberries, as shown in FIG. 7(b).

When this manner of operation is carried out, the learning device units perform "article detection" and "good/poor quality determination," with information obtained by a vision sensor as input. The learning device unit installed in the apparatus 1 discards cakes determined to be of poor quality from the belt conveyor, and tops cakes determined to be of good quality with cream. The learning device unit installed in the apparatus 2 stops the line when a cake is determined to be of poor quality, and tops cakes determined to be of good quality with strawberries.

7-1. When the Learning Device Unit According to First Embodiment is Used

FIGS. 8 to 11 are schematic drawings for describing, in detail, specific examples of applications of the learning device unit according to the first embodiment of the present invention.

Figure 8:
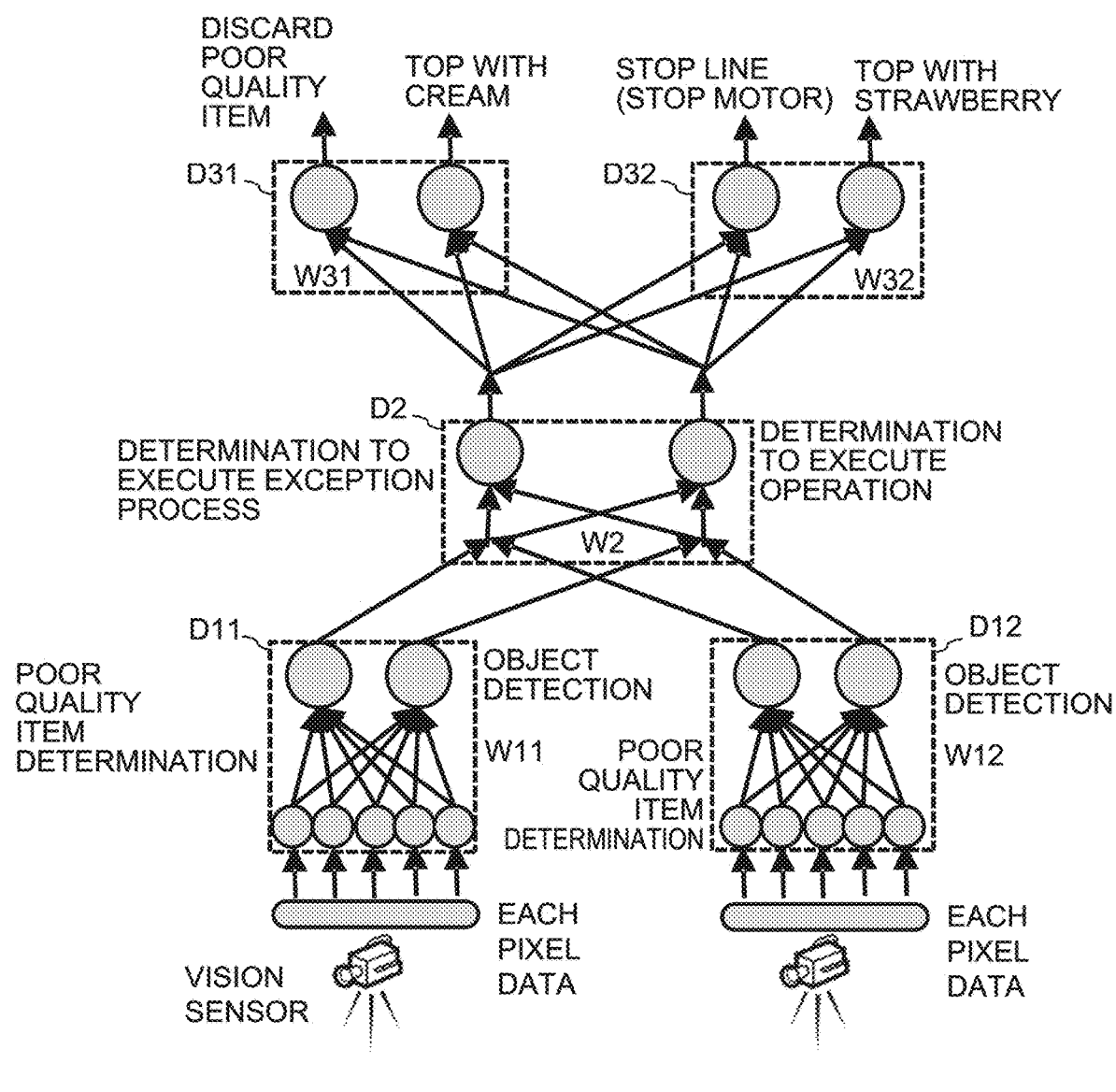
FIG. 8 is a schematic drawing for illustrating, in detail, a specific example of an application of the learning device unit according to the first embodiment of the present invention.

In the example shown in FIG. 8, two apparatuses (an apparatus 1 and an apparatus 2) are used as the apparatus. Input is image data of vision sensors provided for the apparatus 1 and the apparatus 2, respectively. Output, which differs depending on the apparatus, is specifically "discard poor item" and "top with cream" in the apparatus 1, and "stop line" and "top with strawberries" in the apparatus 2.

First, focusing on the apparatus 1, when the input-side learning device D11 included in the learning device unit of the apparatus 1 has the configuration in FIG. 8, for example, the device inputs image data of the vision sensor and outputs two-dimensional characteristic vectors. It is assumed that after learning has converged, this input-side learning device D11 can carry out the function of detecting that any object is approaching via the belt conveyor, and the function of determining whether or not the object has the proper round shape.

The input-side learning device D12 included in the learning device unit of the apparatus 2 also inputs image data of a vision sensor and outputs two-dimensional characteristic vectors. It is assumed that after learning has converged, this input-side learning device D12 can carry out the function of detecting that any object is approaching via the belt conveyor, and the function of determining whether or not the object has the proper square shape, i.e., a process that differs according to the differences in measurement devices to which the learning device units are connected.

Next, focusing on the learning device 2, the intermediate learning device D2 inputs the outputs of the input-side learning devices D11, D12, and outputs two-dimensional characteristic vectors when configured as shown in FIG. 8, for example. It is assumed that after learning has converged, this intermediate learning device D2 can express the result of determining whether or not to perform an exception process (the process of poor quality items), and the result of determining whether or not to execute the next operation (manufacturing process) on a proper quality item, i.e., a common process not dependent on the properties of the measurement devices or output devices to which the respective learning device units are connected.

Next, focusing on the learning device 3, the output-side learning device D31 included in the learning device unit of the apparatus 1 inputs the output of the intermediate learning device D2, and outputs "discard poor quality item" and "top with cream." It is assumed that the output-side learning device D32 included in the learning device unit of the apparatus 2 can carry out the process of inputting the output of the intermediate learning device D2 and outputting "stop line" and "top with strawberries," i.e., different processes depending on the difference in output devices to which the respective learning device units are connected.

Specifically, for a poor quality item, the output-side learning device D31 outputs a signal indicating a command to "discard poor quality item," and the output-side learning device D32 outputs a signal indicating a command to "stop line." For a proper quality item, the output-side learning device D31 outputs a signal indicating a command to "top with cream." The signals outputted to the output-side devices in this manner are transmitted to the output device 50 via the output I/F 18.

Figure 9:
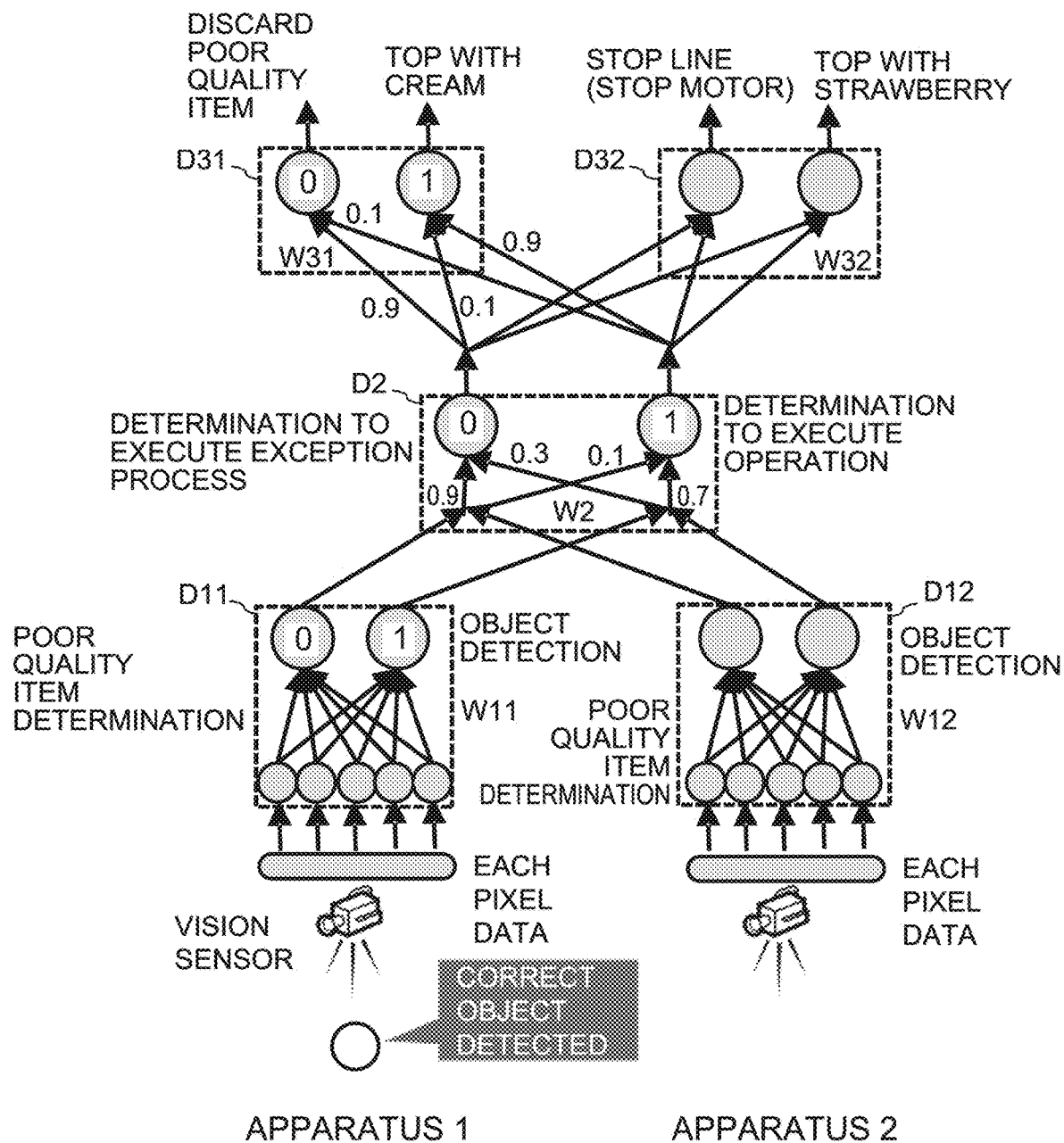
FIG. 9 is a schematic drawing for illustrating, in detail, a specific example of an application of the learning device unit according to the first embodiment of the present invention.

Next, an examination is made of the outputs of the learning devices when the learning device unit 10-1 installed in the apparatus 1 has detected a "correct object," in a case in which the weightings W of the neurons are assumed to be as marked in FIG. 9 as a result of the learning performed in the learning device unit 10-1 installed in the apparatus 1.

FIG. 9 abbreviates the weighting W11 of the input-side learning device D11, but an output of "1," as an output indicating object detection, is a value that has been through the bias (θ) and the activation function ($f_k$). An output of "0" indicates a "determination of poor quality."

In the intermediate learning device D2, an output of "1" indicates a "determination to execute operation," and an output of "0" indicates a "determination to execute exception process. "In the output-side learning device D31, an output of "1" is an instruction to "top with cream," and an output of "0" is an instruction to "discard poor quality item."

Thus, when a correct object is detected, a signal indicating a command to "top with cream" is outputted.

Figure 10:
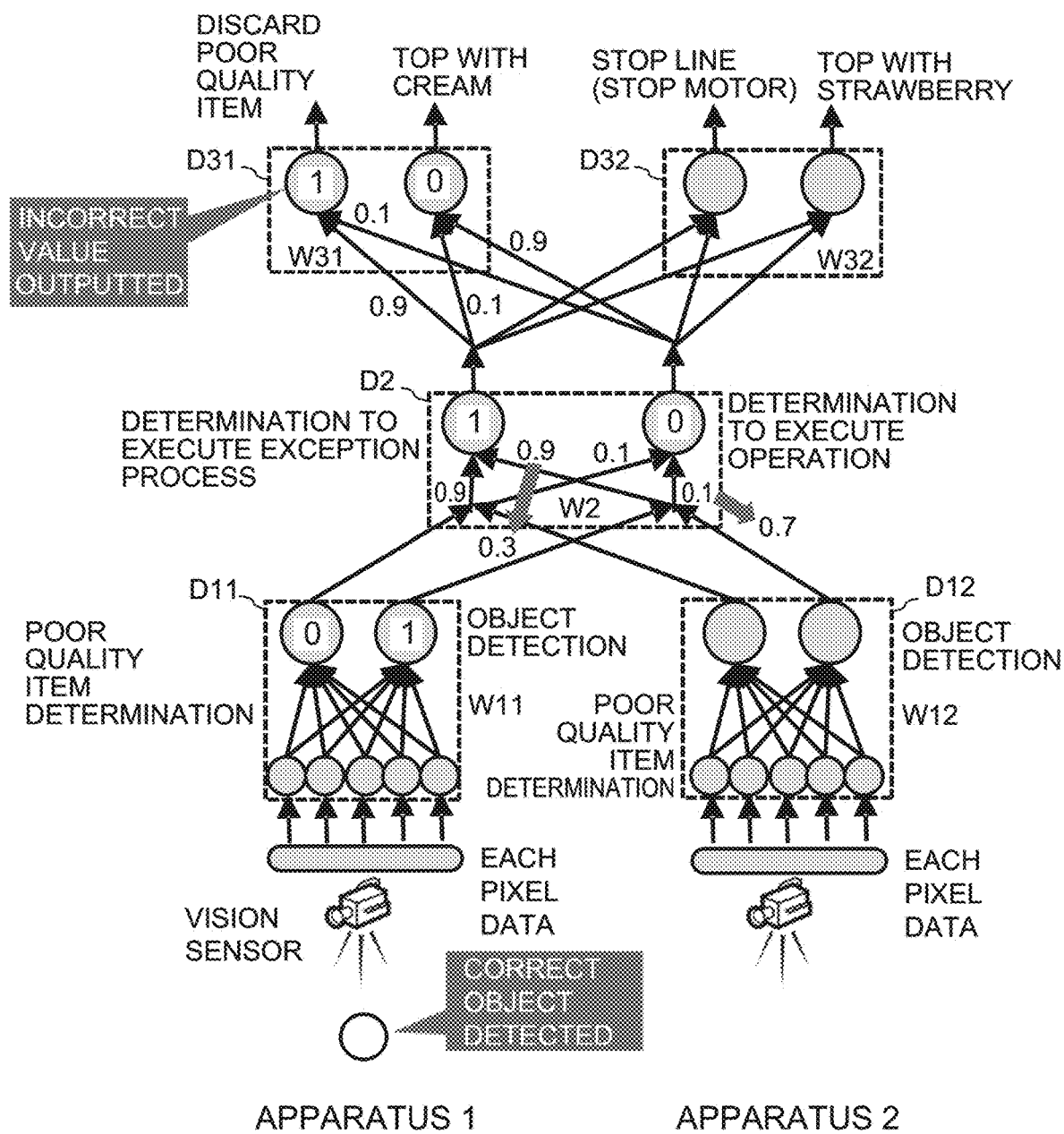
FIG. 10 is a schematic drawing for illustrating, in detail, a specific example of an application of the learning device unit according to the first embodiment of the present invention.

Next is a description, referencing FIG. 10, of the actions whereby the weighting of a learning device is updated using an error back propagation method.

When the input-side learning device D11 of the learning device unit 10-1 installed in the apparatus 1 detects a "correct object," the output-side learning device D31 considers the possibility that "output is incorrect."

"Due to the weighting W2 of the intermediate learning device D2 being different from that shown in FIG. 10, the output of the intermediate learning device D2 is not as expected, and as a result, the output of the output-side learning device D31 is assumed to be incorrect.

In this case, the CPU 11 uses back propagation to reflect the error between the D31 output result and the expected value (the label) in the weightings of the learning devices. Learning thereby progresses so that the weightings of the learning devices have the correct distribution. As one example, FIG. 10 shows the manner in which two weightings, "0.9" and "0.1," given to the output indicating "object detection" of the input-side learning device D11, are updated respectively to "0.3" and "0.7" in W2. After this updating, the output-side learning device D31 outputs a signal indicating a command to "top with cream" when the input-side learning device D11 detects a "correct object," as described above with reference to FIG. 9.

Figure 11:
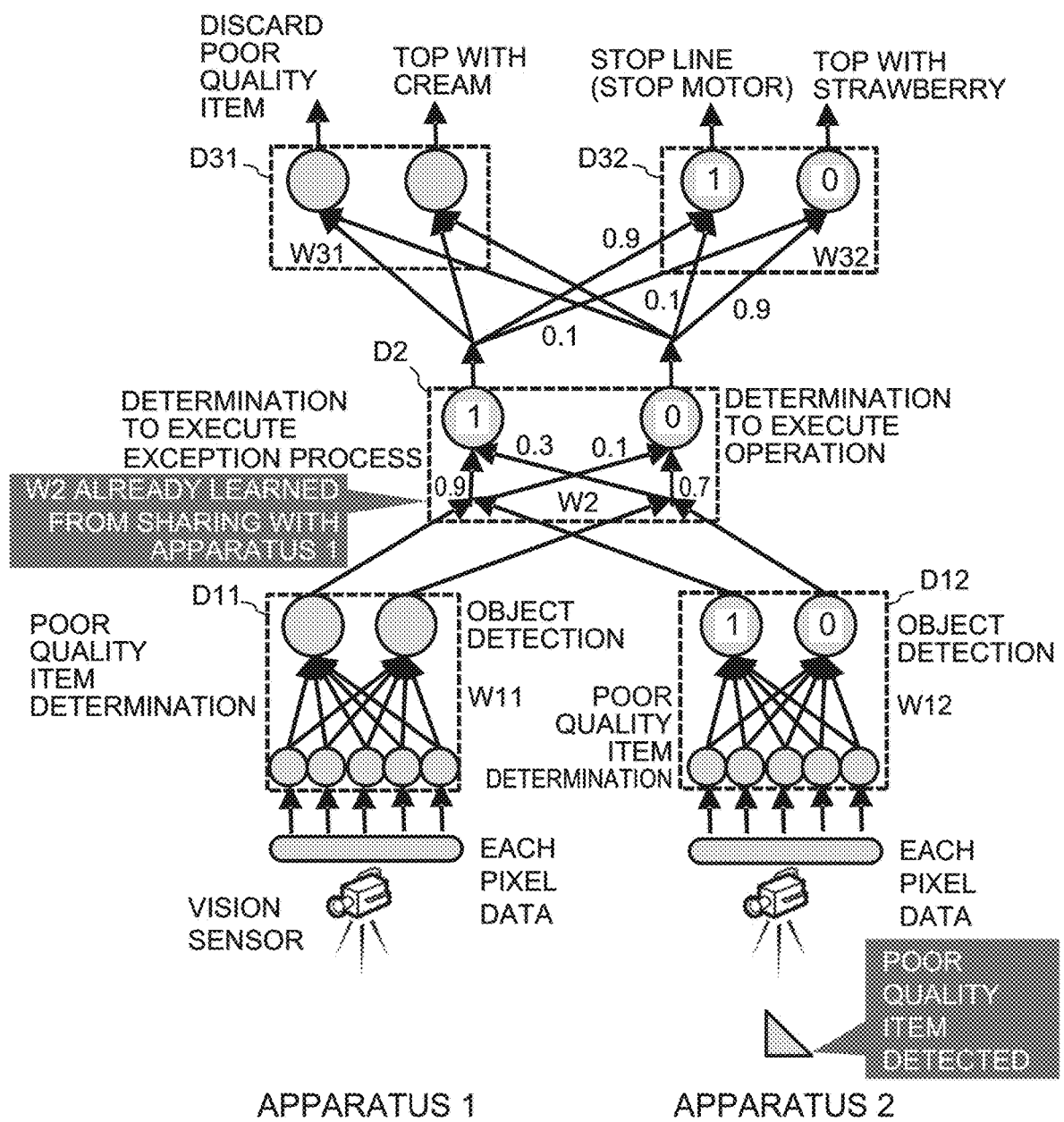
FIG. 11 is a schematic drawing for illustrating, in detail, a specific example of an application of the learning device unit according to the first embodiment of the present invention.

Next, the detection actions and learning of the learning device unit 10-2 installed in the apparatus 2 are considered, with reference to FIG. 11.

The intermediate learning device D2 has the weighting W2 learned by the learning device unit 10-1 installed in the apparatus 1. This weighting W2 (i.e., the internal state of the intermediate learning device D2) is shared by the learning device unit 10-2 installed in the apparatus 2. Specifically, to put it extremely, even if the learning device unit 10-2 itself does not actually perform learning, the unit can perform a "determination to execute operation" and a "determination to execute exception process" simply and precisely by utilizing the internal state (weighting) of the intermediate learning device D2 obtained from the learning of other learning device units.

FIG. 11 shows an example of the state of the learning devices during the action of stopping the line when a poor quality item is detected.

7-2. When the Learning Device Unit According to Second Embodiment is Used

Figure 12:
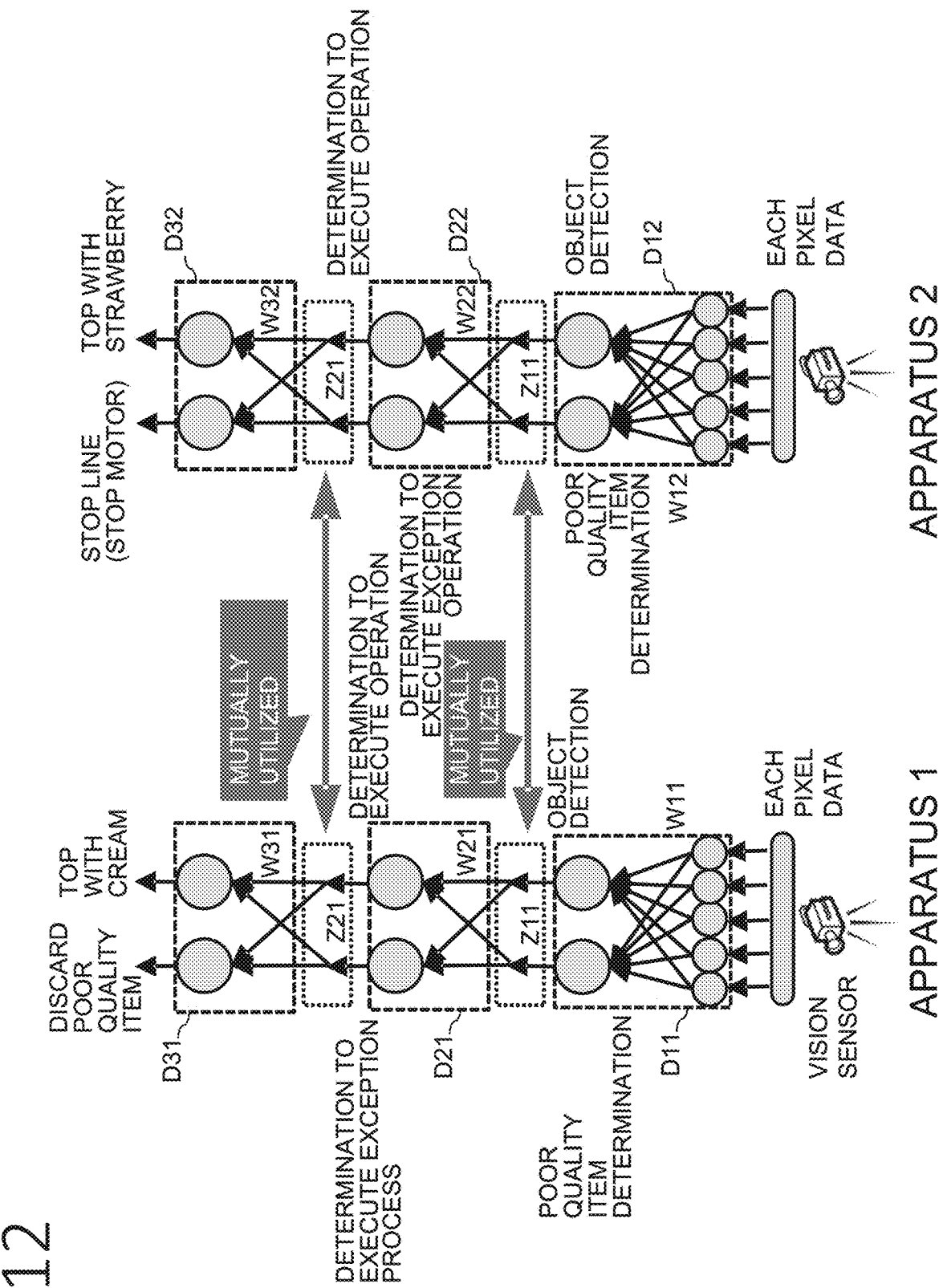
FIG. 12 is a schematic drawing for illustrating, in detail, a specific example of an application of the learning device unit according to the second embodiment of the present invention.

FIG. 12 is a schematic drawing for illustrating, in detail, a specific example of an application of the learning device unit according to the second embodiment of the present invention.

The intermediate learning device D21 of the learning device unit 10-1 installed in the apparatus 1 shares a set of the information (the characteristic vectors Z12) inputted to the intermediate learning device D22 of the learning device unit 10-2 installed in the apparatus 2 and the corresponding information (the characteristic vectors Z22) outputted from the intermediate learning device D22, as described above with reference to FIG. 5. Because this set is information that results in the intermediate learning device D22 having an internal state (the weighting W22), the internal state of the intermediate learning device D21 is able to further approach the internal state of the intermediate learning device D22, due to the learning device unit 10-1 executing learning using this set. Therefore, the intermediate learning device D21 can indirectly share an internal state with the intermediate learning device D22.

Similarly, the intermediate learning device D22 of the learning device unit 10-2 installed in the apparatus 2 shares the set of the information (the characteristic vectors Z11) inputted to the intermediate learning device D21 of the learning device unit 10-1 installed in the apparatus 1 and the corresponding information (the characteristic vectors Z21) outputted by the input-side learning device D12. Therefore, the intermediate learning device D22 also can indirectly share an internal state with the intermediate learning device D21 for the reasons described above.

7-3. When the Learning Device Unit According to Third Embodiment is Used

Figure 13:
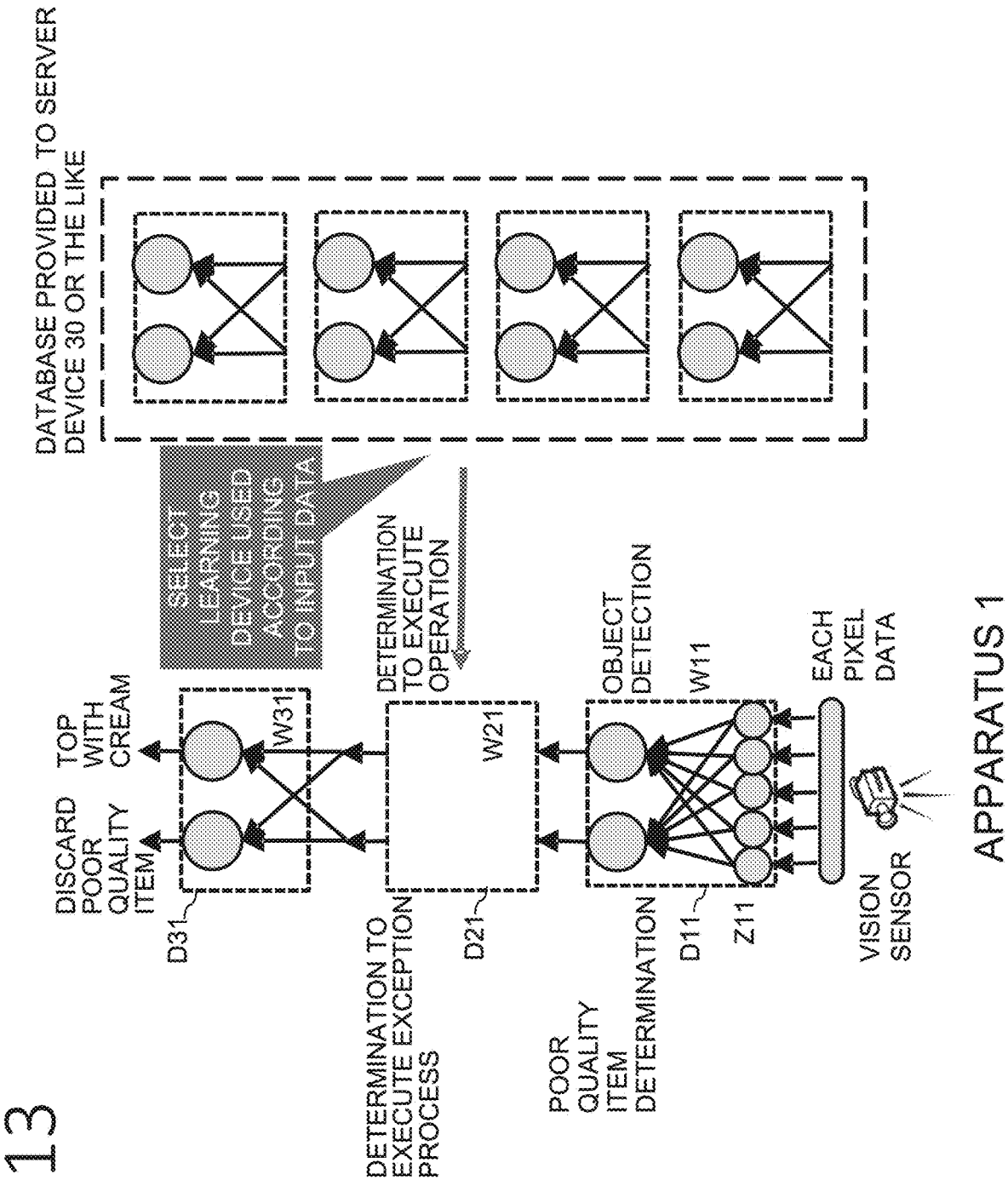
FIG. 13 is a schematic drawing for illustrating, in detail, a specific example of an application of the learning device unit according to the third embodiment of the present invention.

FIG. 13 is a schematic drawing for illustrating, in detail, a specific example of an application of the learning device unit according to the third embodiment of the present invention.

As was described above with reference to FIG. 6, the intermediate learning device D21 of any of the learning device units (e.g., of the learning device unit 10-1 installed in the apparatus 1) acquires, via the communication circuit, a weighting (internal state) selected from among multiple weightings stored in the database (storage device) provided to the server device 30 or the like. The intermediate learning device D21 can thereby utilize the selected weighting (internal state) in accordance with the input data or the internal state of the input-side learning device. To achieve this, the intermediate learning device D21 or the learning device unit 10-1 may be provided with a learning function (deciding means) for deciding either the input received by the learning device unit 10-1 (the learning device included in the learning device unit 10-1) or the internal state of the learning device unit 10-1 (the internal state of the learning device included in the learning device unit 10-1), and the intermediate learning device D21 may, on the basis of the input or the internal state decided by the learning function, acquire the optimal weighting (internal state) from among multiple weightings stored in the storage device. Specifically, not only does the learning function use an identification method (deciding method) initially set in advance, but when, for example, the output of the output-side learning device (the output of the entire learning device unit) is not the expected output, the learning function can learn what to select from the database using the input to the identification method, i.e., the learning function can learn how to change the identification method (deciding method) in accordance with the database selection. The learning device prepared to execute the learning function within the learning device unit can, given the input, internal state, and error between output and expected output, execute learning by a method such as using some of the output vectors of the learning device unit for identification.

The specific applications described above are merely examples used in order to make the description easier to understand, and characteristics such as the format and meaning of the input/output data of the blocks and the processed contents of the blocks are not limited to what has been described. Even if information to be shared which is independent of the apparatus (information pertinent to the intermediate learning device) and information dependent on the apparatus (information pertinent to the input-side learning device and the output-side learning device) is not explicitly provided by a user, the information is automatically isolated as learning progresses.

8. Modifications

In the cases described so far, there has been one intermediate learning device shared by a plurality of apparatuses (by learning device units installed in the apparatuses) in order to keep the description simple. However, the apparatuses (the learning device units installed in the apparatuses) may simultaneously utilize a plurality of intermediate learning devices.

Figure 14:
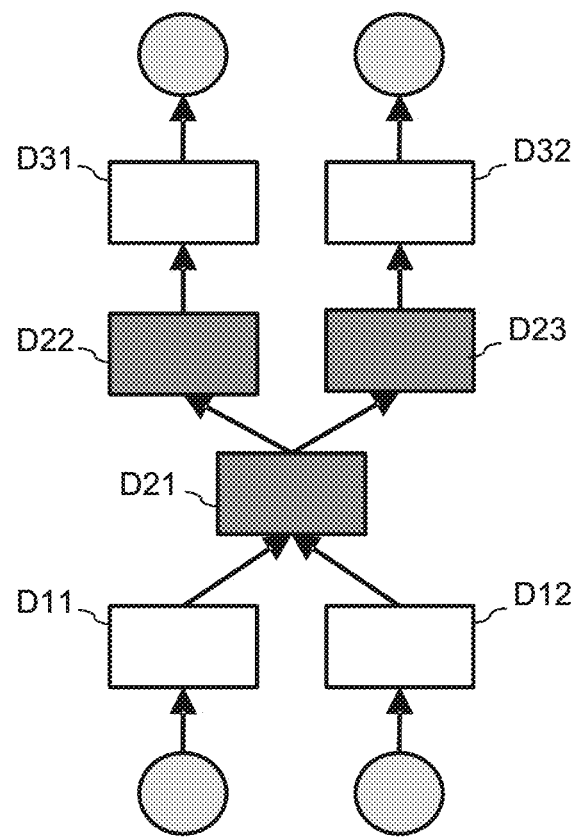
FIG. 14 is a schematic drawing showing a modification of an intermediate learning device provided to a learning device unit according to an embodiment of the present invention.

For example, in the apparatuses (the learning device units installed in the apparatuses), two intermediate learning devices D22, D23 are provided in parallel with each other and connected in series to the intermediate learning device D21, as shown in FIG. 14. To be more general, the intermediate learning device according to the various embodiments can at least include one or a plurality of intermediate learning devices, and one or a plurality of intermediate learning devices connected in series and/or in parallel thereto.

A specific example in which learning device units installed in different apparatuses share a plurality of intermediate learning devices is described with reference to the previously used FIG. 8. These intermediate learning devices can be provided as learning devices for dealing with mutually different target ranges. Instead of the intermediate learning device D2 shown in FIG. 8, an intermediate learning device D21 intended to be shared by the "society as a whole" is prepared as a first intermediate learning device, and an intermediate learning device D22 intended to be shared "among apparatuses within the plant" is prepared as a second intermediate learning device between the intermediate learning device D21 and the subsequent output-side learning devices D31, D32. The intermediate learning device D21, which is shared by, e.g., 10,000 other learning device units, performs a calculation process based on a more common skill and outputs "determination to execute exception process" and "operation execution determination process." The intermediate learning device D22, which is shared by 50 other learning device units disposed in a certain plant (including the learning device unit installed in the apparatus 1 and the learning device unit installed in the apparatus 2), outputs "process for poor quality item" and "continuously execute manufacturing." Using a skill locally shared in this plant, the intermediate learning device D22 thereby outputs the instruction to perform the process for a poor quality item when input is received from the intermediate learning device D21 requesting the exception process to be executed and the operation to not be executed. These outputs are inputted to the output-side learning device D31. Learning conforming to output-side characteristics such as "discard poor quality item" is thereby performed by the output-side learning device D31. As was exemplified above, the intermediate learning device according to the various embodiments can suitably include a plurality of intermediate learning devices.

The various embodiments were described above in the case of a learning device based on supervised learning using a neural network. In this case, the actions and characteristics of "common (known)" learning in one apparatus can be said to "acquire and use labeled data (a grouping of input/output data) corresponding to each apparatus, and perform learning to optimize the function that actualizes the learning device, so that the output is correct for the input."

However, the various embodiments are not limited to this method. For example, when the problem is to discern what action to take in a scenario such as automatic operation or robot control, the framework of not only supervised learning but also of reinforcement learning can be utilized.

Depending on the problem being addressed, machine learning using no neural network can also be utilized. For example, in a case such as when data is gathered in the same conditions among many apparatuses and the characteristics of the input data are understood, there is no need to use a neural network. In this case, a feature extractor, known to be empirically superior, can be used in the input-side learning device. Clustering, dimension reduction, dictionary learning, and other unsupervised learning algorithms are performed in the intermediate learning device, and these algorithms are implemented using the inputs of many apparatuses. In the case of reinforcement learning, for example, the output-side learning device executes Q learning in common table form, classical control theory, or the like.

In machine learning using a neural network, learning can be performed with one learning device using camera image data, speed data, and other numerous forms of data having different dimensions.

The processes and procedures have been described in the present description merely for illustrative purposes in the embodiments, and may be realized through software, hardware, or some combination thereof. Specifically, the processes and procedures described in the present description may be realized by installing logic that corresponds to the processes in question, on media such as integrated circuits, volatile memory, nonvolatile memory, magnetic disks, optical storage, and the like. It is also possible for the processes and procedures described in the present description to be realized by installing these processes/procedures in computer program form, for execution by computers of various types including terminal devices and server devices.

Even where the processes and procedures are described in the present description as being executed by a single device, software program, component, or module, such processes and procedures can also be executed by multiple devices, multiple software programs, multiple components, and/or multiple modules. Even where the various information described in the present description is described as being stored in a single memory unit or storage unit, such information can be stored in distributed fashion in multiple memory units provided to a single device, or in multiple memory units distributed among multiple devices. The software and hardware elements described in the present description can be consolidated into a smaller number of constituent elements, or divided up into a greater number of constituent elements.

9. Applications of Learning Device Units According to Various Embodiments

To make the descriptions above easier to understand, cases were described in which the various embodiments were applied to a manufacturing process used in a food plant. However, the various embodiments disclosed in the present description are not limited to these cases; they can be applied to various other applications. For example, these embodiments can be applied to the various applications exemplified below.

(1) Automobiles

The learning device unit according to the various embodiments can take, as inputs, sensor information of a camera, distance sensor, GPS, or the like installed in an automobile, and can output a presentation of operation assistance information or an indication that automatic operation is performed. In this case, sensor information or the like outputted from each apparatus, i.e., each automobile (the learning device unit according to the various embodiments is installed in each apparatus) can be efficiently utilized.

(2) Manufacturing

The learning device unit according to the various embodiments can input information from a plurality of manufacturing devices or robots used in manufacturing, and can output commands issued to these manufacturing devices or robots. The learning device unit according to the various embodiments could be utilized for purposes such as actualizing high-altitude robot control, optimizing processes, or predicting emergencies, for example.

(3) Agriculture

The learning device unit according to the various embodiments can be applied to environment control in greenhouse cultivation; e.g., the learning device unit could be utilized for purposes such as actualizing environment control according to changes in the environment outside the greenhouse, minimizing energy consumption, and sharing the cultivation method according to the type of product.

(4) General Machinery Having Sensors or Control Devices

The learning device unit according to the various embodiments could be applied to a plurality of devices and utilized for purposes such as presenting the results of analyzing sensor information or controlling the devices.

In any application, use of the learning device unit according to the various embodiments can improve precision and the time costs incurred utilizing sensor information, in comparison to conventional methods.

In the various embodiments, a common skill is shared among learning device units (among the intermediate learning devices thereof) installed in many apparatuses (devices), as was described above. Specifically, each of the learning device units installed in the many apparatuses (devices) is configured so as to include a learning device for learning information unique to the apparatus, and a learning device for performing learning for information that can be shared with other apparatuses. When executing learning, the learning device units installed in the apparatuses having this configuration utilize input/output data and/or learning results (including internal state, output obtained when any sort of data is inputted to a learning device, etc.) obtained by learning device units installed in other apparatuses.

Learning can thereby be executed in a shorter amount of time than in cases in which large amounts of data are collected independently in each apparatus and learning is executed. Furthermore, learning can be executed with less of a decrease in precision than in cases in which the data obtained in the apparatuses is synthesized in a simple manner (e.g., the method disclosed in Patent Document 1).

KEY

Reference Numbers

10 Learning device unit
11 CPU
13 Input I/F
14 Communication I/F
18 Output I/F
20 Communication circuit
30 Server device
40 Measurement device
50 Output device
D11-D13 Input-side learning devices
D2, D21, D22 Intermediate learning devices
D31-D33 Output-side learning devices

The invention claimed is:

1. An apparatus comprising:
   at least one memory storing therein an intermediate neural network model; and
   at least one processor configured to execute said intermediate neural network model, wherein said intermediate neural network model is respectively inputted:
   first information based on information outputted by a first neural network model included in a first machinery which is based on information from a first sensor included in said first machinery, wherein said first machinery incorporates said first sensor, a first memory storing said first neural network model, and a first processor configured to execute said first neural network model; and
   second information based on information outputted by a third neural network model included in a second machinery which is based on information from a second sensor included in said second machinery, wherein said second machinery incorporates said second sensor, a second memory storing said third neural network model, and a second processor configured to execute said third neural network model;
   wherein said first and second memories are distinct from said at least one memory, and said first and second processors are distinct from said at least one processor;
   wherein said apparatus, said first machinery and said second machinery are different from each other; and
   wherein said at least one processor is configured to execute said intermediate neural network model, so that said intermediate neural network model is at least capable of outputting information based on either (i) inputting said first information via a first connection from said first machinery to said apparatus or (ii) inputting said second information via a second connection from said second machinery to said apparatus.

2. The apparatus according to claim 1, wherein said intermediate neural network model uses, for learning, information outputted by said first neural network model and information outputted by said third neural network model.

3. The apparatus according to claim 1, wherein said intermediate neural network model and said first neural network model learn successively by error back-propagation method from said intermediate neural network model, and said intermediate neural network model and said third neural network model learn successively by error back-propagation method from said intermediate neural network model.

4. The apparatus according to claim 1, wherein third information, outputted based on said first information inputted into said intermediate neural network model, is transmitted to said first machinery, and fourth information, outputted based on said second information inputted into said intermediate neural network model, is transmitted to said second machinery.

5. The apparatus according to claim 4, wherein said third information is transmitted to said first machinery as information to be inputted into a second neural network model included in said first machinery, and wherein said fourth information is transmitted to said second machinery as information to be inputted into a fourth neural network model included in said second machinery.

6. The apparatus according to claim 4, wherein said third information is used for controlling said first machinery, and wherein said fourth information is used for controlling said second machinery.

7. The apparatus according to claim 6, wherein said second neural network model, said intermediate neural network model, and said first neural network model learn by error back-propagation method.

8. The apparatus according to claim 7, wherein said third neural network model, said intermediate neural network model and said fourth neural network model learn by error back-propagation method.

9. The apparatus according to claim 1, wherein said outputted information from said intermediate neural network model is outputted to said first machinery for operating said first machinery, is based on the first neural network model, and is not based on said third neural network model.

10. The apparatus according to claim 1, wherein back propagation process of said first machinery is based on (i) said intermediate neural network model and (ii) said first neural network model or a neural network model comprised in said first machinery, and is not based on said third neural network model or a neural network model comprised in said second machinery.

11. A system comprising:
    said apparatus according to claim 1;
    said first machinery; and
    said second machinery.

12. The system according to claim 11, wherein each of said first machinery and second machinery is: an automobile, an airplane, a robot, an industrial machine, an environment control terminal of a chemical plant, or facility horticulture.

13. An apparatus comprising:
    at least one memory storing therein an intermediate neural network model; and
    at least one processor configured to execute said intermediate neural network model,
    wherein said intermediate neural network model outputs:
    first information used for input information for a second neural network model included in a first machinery, said second neural network model outputting second information used for controlling said first machinery, wherein said first machinery incorporates a first memory configured to store said second neural network model, and a first processor configured to execute said second neural network model, and
    third information used for input information for a fourth neural network model included in a second machinery, said fourth neural network model outputting fourth information used for controlling said second machinery, wherein said second machinery incorporates a second memory storing said fourth neural network model and a second processor configured to execute said fourth neural network model;
    wherein said first and second memories are distinct from said at least one memory, and said first and second processors are distinct from said at least one processor;
    wherein said apparatus, said first machinery and said second machinery are different from each other; and
    wherein said at least one processor is configured to execute said intermediate neural network model, so that said intermediate neural network model is at least capable of outputting either (i) said first information transmitted via a first connection from said apparatus to said first machinery or (ii) said third information transmitted via a second connection from said apparatus to said second machinery.

14. The apparatus according to claim 13, wherein said first information is obtained by inputting fifth information received from said first machinery into said intermediate neural network model, and said third information is obtained by inputting sixth information received from said second machinery into said intermediate neural network model.

15. The apparatus according to claim 13, wherein said second neural network model and said intermediate neural network model learn successively by error back-propagation method from said second neural network model.

16. The apparatus according to claim 13, wherein said second information for controlling said first machinery is based on said second neural network model, and is not based on said fourth neural network model.

17. The apparatus according to claim 13, wherein back propagation process of said first machinery is based on (i) said intermediate neural network model and (ii) said second neural network model or a neural network model comprised in said first machinery, and is not based on said fourth neural network model or a neural network model comprised in said second machinery.

18. A method comprising:
    obtaining first information by inputting information, via a first connection from a first machinery to an intermediate learning device unit, based on information outputted by a first neural network model included in said first machinery into an intermediate neural network model included in said intermediate learning device unit, and
    obtaining second information by inputting information, via a second connection from a second machinery to said intermediate learning device unit, based on information outputted by a third neural network model in said second machinery into said intermediate neural network model included in said intermediate learning device unit,
    wherein said information outputted by said first neural network model is based on information from a first sensor included in said first machinery, wherein said first machinery incorporates said first sensor, a first memory configured to store said first neural network model, and a first processor configured to execute said first neural network model,
    wherein said information outputted by said third neural network model is based on information from a second sensor included in said second machinery, wherein said second machinery incorporates said second sensor, a second memory storing said third neural network model, and a second processor configured to execute said third neural network model,
    wherein said first and second memories are distinct from at least one memory included in said intermediate learning device unit, and said first and second processors are distinct from at least one processor included in said intermediate learning device unit,
    wherein said intermediate learning device unit, said first machinery and said second machinery are different from each other, and
    wherein said intermediate neural network model is at least capable of (i) outputting said first information based on said information inputted via said first connection or (ii) outputting said second information based on said information inputted via said second connection.

19. The method according to claim 18, further comprising learning carried out by said intermediate neural network model based on information outputted by said first neural network model and information output by said third neural network model.

20. The method according to claim 18, wherein learning is carried out:
    by said intermediate neural network model and said first neural network model successively using error back-propagation method from said intermediate neural network model; and
    by said intermediate neural network model and said third neural network model successively using error back-propagation method from said intermediate neural network model.

21. The method according to claim 18, further comprising learning carried out by said first neural network model regarding information unique to said first machinery.

22. The method according to claim 18, further comprising transmitting said first information to said first machinery, and transmitting said second information to said second machinery.

23. The method according to claim 22, wherein said transmitting said first information to said first machinery is directed to an input of a second neural network model included in said first machinery, and said transmitting said second information to said second machinery is directed to an input of a fourth neural network model included in said second machinery.

24. The method according to claim 23, wherein said first information is used for controlling said first machinery and said second information is used for controlling said second machinery.

25. The method according to claim 23, further comprising learning carried out by said second neural network model, said intermediate neural network model, and said first neural network model successively by error back-propagation method from said second neural network model.

26. The method according to claim 25, further comprising learning carried out by said third neural network model, said intermediate neural network model, and said fourth neural network model successively by error back-propagation method from said fourth neural network model.

27. A method comprising:
    transmitting first information generated by an intermediate neural network model included in an intermediate learning device unit to first machinery,
    transmitting second information generated by said intermediate neural network model included in said intermediate learning device unit to second machinery,
    wherein said first information transmitted to said first machinery is used for input to a second neural network model to output third information used for controlling said first machinery, wherein said first machinery incorporates a first memory configured to store said second neural network model, and a first processor configured to execute said second neural network model,
    wherein said second information transmitted to said second machinery is used for input to a fourth neural network model to output fourth information used for controlling said second machinery,
    wherein said second machinery incorporates a second memory storing said fourth neural network model and a second processor configured to execute said fourth neural network model,
    wherein said first and second memories are distinct from at least one memory included in said intermediate learning device unit, and said first and second processors are distinct from at least one processor included in said intermediate learning device unit, wherein said intermediate learning device unit, said first machinery and said second machinery are different from each other, and wherein said intermediate learning device unit is at least capable of outputting either (i) said first information transmitted via a first connection from said intermediate neural network model to said first machinery, or (ii) said third information transmitted via a second connection from said intermediate neural network model to said second machinery.

28. The method according to claim 27, wherein said first information transmitted to first machinery is based on outputted information generated by inputting information based on information received from said first machinery into said intermediate neural network model, and wherein said second information transmitted to second machinery is based on outputted information generated by inputting information based on information received from said second machinery into said intermediate neural network model.

29. The method according to claim 27, further comprising learning carried out by said second neural network model and said intermediate neural network model successively by error back-propagation method from said second neural network model and learning carried out by said fourth neural network model and said intermediate neural network model successively by error back-propagation method from said fourth neural network model.

* * * * *